United States Patent
Buddendick et al.

(10) Patent No.: US 10,914,831 B2
(45) Date of Patent: Feb. 9, 2021

(54) FMCW RADAR SENSOR FOR MOTOR VEHICLES

(71) Applicant: Robert Bosch GmbH, Stuttgart (DE)

(72) Inventors: Hermann Buddendick, Sindelfingen (DE); Markus Schlosser, Karlsruhe (DE)

(73) Assignee: Robert Bosch GmbH, Stuttgart (DE)

( * ) Notice: Subject to any disclaimer, the term of this patent is extended or adjusted under 35 U.S.C. 154(b) by 351 days.

(21) Appl. No.: 16/001,460

(22) Filed: Jun. 6, 2018

(65) Prior Publication Data

US 2018/0356511 A1    Dec. 13, 2018

(30) Foreign Application Priority Data

Jun. 8, 2017   (DE) .................. 10 2017 209 628

(51) Int. Cl.
  *G01S 13/58* (2006.01)
  *G01S 13/60* (2006.01)
  (Continued)

(52) U.S. Cl.
  CPC .............. *G01S 13/584* (2013.01); *G01S 7/03* (2013.01); *G01S 7/35* (2013.01); *G01S 7/354* (2013.01);
  (Continued)

(58) Field of Classification Search
  CPC ......... G01S 13/931; G01S 2013/93271; G01S 2013/932; G01S 13/60; G01S 13/584;
  (Continued)

(56) References Cited

U.S. PATENT DOCUMENTS 10,252,717 B2 * 4/2019 Avedisov .............. B60W 30/16
2012/0001791 A1 * 1/2012 Wintermantel ......... G01S 7/038
                                                              342/109
(Continued)

OTHER PUBLICATIONS

Matthias Rapp, Michael Barjenbruch, Klaus Dietmayer, Markus Hahn, Jurgen Dickman, A Fast Probabilistic Ego-Motion Framework for Radar, 2015, IEEE, 2015 Conference on Mobile Robotics (Year: 2015).*

(Continued)

*Primary Examiner* — Olumide Ajibade Akonai
(74) *Attorney, Agent, or Firm* — Norton Rose Fulbright US LLP; Gerard Messina

(57) ABSTRACT

An FMWC radar sensor for motor vehicles, having a high-frequency oscillator, which is developed to generate a frequency-modulated transmit signal that has a periodically repeating series of modulation sequences having different modulation patterns, and having an evaluation device for evaluating the received radar echo according to the FMCW principle, wherein the series of the modulation sequences includes a special class of modulation sequences whose duration is longer than that of any other modulation sequence not belonging to this class and whose frequency swing is smaller than that of any other modulation sequence, and the evaluation device is developed to carry out a measurement of the ego velocity of the vehicle on the basis of a radar echo that is received from non-moving objects during the modulation sequences that belong to the special class.

8 Claims, 3 Drawing Sheets

(51) Int. Cl.
*G01S 13/32* (2006.01)
*G01S 13/34* (2006.01)
*G01S 7/35* (2006.01)
*G01S 7/03* (2006.01)
*G01S 13/536* (2006.01)
*G01S 13/931* (2020.01)

(52) U.S. Cl.
CPC ............ *G01S 13/32* (2013.01); *G01S 13/345* (2013.01); *G01S 13/536* (2013.01); *G01S 13/60* (2013.01); *G01S 13/931* (2013.01); *G01S 13/605* (2013.01); *G01S 2013/932* (2020.01); *G01S 2013/93271* (2020.01)

(58) Field of Classification Search
CPC .......... G01S 7/415; G01S 7/354; G01S 13/26; G01S 13/34; G01S 13/32; G01S 13/345; G01S 13/343; G01S 13/347; G01S 13/52
See application file for complete search history.

(56) References Cited

U.S. PATENT DOCUMENTS

| | | | |
|---|---|---|---|
| 2013/0085976 A1* | 4/2013 | Bone | G06N 5/02 706/46 |
| 2014/0253365 A1* | 9/2014 | Kirsch | G01S 13/347 342/112 |
| 2015/0005993 A1* | 1/2015 | Breuing | B61L 25/026 701/19 |
| 2016/0124075 A1* | 5/2016 | Vogt | G01S 13/325 342/13 |
| 2016/0131742 A1* | 5/2016 | Schoor | H01Q 25/00 342/128 |
| 2017/0307728 A1* | 10/2017 | Eshraghi | G01S 13/931 |
| 2019/0137606 A1* | 5/2019 | Buddendick | G01S 13/931 |

OTHER PUBLICATIONS

Weber, Norbert, et al. "A Novel Signal Processing Approach for Microwave Doppler Speed Sensing" 2002 IEEE MTT-S Digest, pp. 2233-2235.

* cited by examiner

FMCW RADAR SENSOR FOR MOTOR VEHICLES

CROSS REFERENCE

The present application claims the benefit under 35 U.S.C. § 119 of German Patent Application No. DE 102017209628.4 filed on Jun. 8, 2017, which is expressly incorporated herein by reference in its entirety.

FIELD

The present invention relates to an FMCW radar sensor for motor vehicles, which has a high-frequency oscillator designed to generate a frequency-modulated sensor signal that has a periodically repeating series of modulation sequences having different modulation patterns; it also has an evaluation device for evaluating the received radar echo according to the FMCW principle.

BACKGROUND INFORMATION

FMCW radar sensors are used in motor vehicles mainly for measuring distances and relative velocities of vehicles driving ahead. For this reason, the radar sensor is typically installed in the front of the vehicle and emits the radar beams essentially in the longitudinal direction of the vehicle. The radar beam has only a limited opening angle in azimuth and also in elevation.

The modulation patterns in an FMCW radar are typically formed by frequency edges at which the frequency of the transmit signal rises or falls in a linear fashion. The radar echo received from an object is mixed with a component of the transmit signal that is currently radiated by the antenna. This provides an intermediate frequency signal whose frequency is equal to the difference between the frequency of the transmitted signal and the received signal. Due to the frequency modulation, this intermediate frequency signal is a function of the signal propagation time and thus of the distance of the object. The signal also has a velocity-dependent component because of the Doppler effect. The ambiguity between distance and speed components is able to be resolved by carrying out measurements with multiple edges that differ with regard to their gradient.

A radar sensor is described in German Patent Application No. DE 10 2004 024 706 A1; in this case, other modulation patterns are also present in addition to the edge-type modulation patterns. This makes it possible to carry out the measurements in different measuring modes in the time multiplex, or to selectively adapt the particular used measuring mode to the current traffic situation and to the demand that results therefrom.

Generally, driver-assistance systems and especially systems for the highly automated driving also require accurate knowledge of the ego velocity of the vehicle. Although the ego velocity may in principle be determined with the aid of the signals from wheel-speed sensors that are part of an ESP system, these measurements always include a certain calibration error because the exact wheel diameter is not known. In addition, with decreasing rotational speed, the accuracy of the wheel-speed sensors tends to worsen.

Conventionally, the ego speed is measured with the aid of an FMCW radar sensor, even if this is done simply in order to calibrate the wheel-speed sensors. For this purpose, the relative velocity of objects is measured that have already been reliably identified as stationary objects due to preceding measurements. However, it is disadvantageous that suitable stationary objects are not available in all situations.

German Patent Application No. DE 198 60 633 A1 describes measuring the ego velocity of a vehicle with the aid of a Doppler radar that is obliquely directed to the road surface in the direction of travel. However, the relative velocity obtained by the Doppler radar is then not directly given by ego velocity v but by a function v*cos($\alpha$), $\alpha$ being the angle that the radar beams form with the road surface.

In Weber, Moedl, Hackner: A Novel Signal Processing Approach for Microwave Doppler Speed Sensing, 2002 IEEE MTT-S Digest, pages 2233 through 2235, a Doppler radar is described whose opening angle is so large that a portion of the radar beams also propagates parallel to the road surface, so that the measuring signal also includes the limit case $\alpha=0$. The power distribution at the Doppler frequency, which corresponds to the limit $\alpha=0$, exhibits an abrupt drop that allows for a measurement of the ego speed without the need to carry out a correction for angles $\alpha$ that differ from zero.

SUMMARY

It is an object of the present invention to provide an FMCW radar sensor that makes it possible to determine the ego speed of the vehicle in a simple and precise manner.

In an FMCW radar sensor of the type mentioned above, this objective may be achieved in that the series of modulation sequences encompasses a special class of modulation sequences whose duration is longer than that of any other modulation sequence not belonging to this class, and whose frequency swing is smaller than that of any other modulation sequence; it is also achieved in that the evaluation device is designed to perform a measurement of the ego speed of the vehicle on the basis of a radar echo received from the road surface during the modulation sequences that belong to the special class.

Since the radar lobe of an FMCW radar sensor has a certain extension in elevation, it includes both radar beams that are directed obliquely to the road surface, and radar beams that are directed obliquely in the upward direction and away from the road surface, and as a limit case, it also includes radar beams that propagate parallel to the road surface. This may offer the possibility of carrying out a measurement of the ego velocity at the limit $\alpha=0$, provided the velocity resolution of the radar sensor is adequate. According to the present invention, the high velocity resolution may be achieved by using special modulation sequences that have a particularly long duration and a particularly low frequency swing. In the extreme case, the frequency swing is equal to zero so that it involves a pure Doppler sequence, so that only the relative velocity is measured and no distance measurement takes place. Due to the greater duration, and thus the longer measuring time of these modulation sequences, the precision of the relative velocity measurement is considerably improved. This makes it possible to measure the relative velocities of the radar targets created by surface irregularities of the road in a highly accurate manner.

In this context it is advantageous that to the extent that angle $\alpha$ approaches the limit value of zero, the radar lobe sweeps an ever larger distance range at the road surface; on the other hand, since the cosine function at $\alpha=0$ has a gradient of zero, the measured Doppler frequencies differ less and less from one another. As a whole, this may lead to a considerable increase in the signal density until the signal finally abruptly drops at the Doppler frequency that corresponds to the ego velocity of the vehicle. This effect is even amplified in that the radar lobe also sweeps an ever larger portion of the road surface in the width direction with increasing distance, while the azimuth angles of the radar beams lie close to zero (in relation to the longitudinal vehicle axis). A cosine function describes the dependency of the relative velocity from the azimuth angle also for the targets that lie beyond the longitudinal vehicle axis, so that in an accumulation of the signal across a specific azimuth angle region, an even stronger signal accumulation and an increase in the signal density occur, which allows for an even clearer detection of the abrupt drop in the signal strength at $\alpha=0$.

Advantageous example embodiments of the present invention are described herein.

In one advantageous embodiment, the "special class of the modulation patterns" includes only a single modulation pattern, and this pattern consists of the transmit signal being transmitted at a constant frequency, i.e., at the frequency swing of zero.

Below, exemplary embodiments of the present invention is described with the aid of the figures.

DETAILED DESCRIPTION OF EXAMPLE EMBODIMENTS

Figure 1:
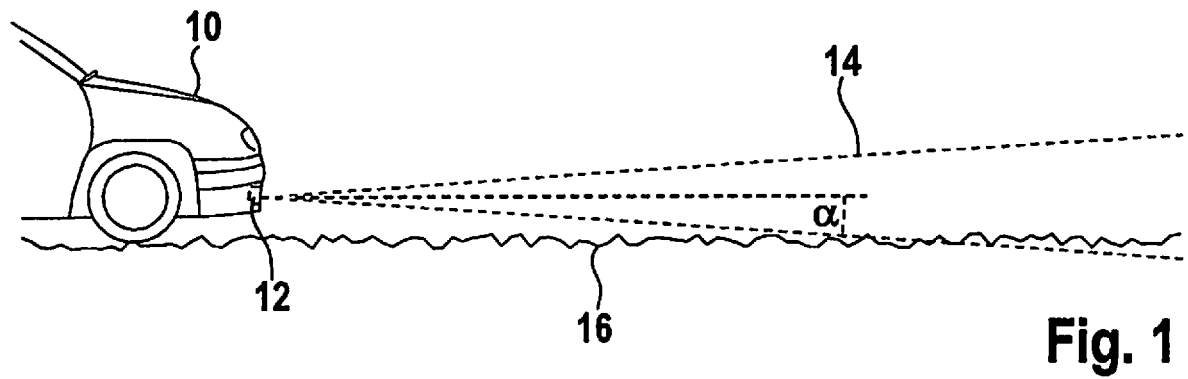
FIG. 1 shows a sketch of an FMCW radar sensor, installed in the front of a motor vehicle, for measuring the ego velocity of the vehicle.

FIG. 1 shows a front part of a motor vehicle 10, which has an FMCW radar sensor 12 installed behind the bumper. The radar sensor emits a radar lobe 14, which is directed toward the front in the direction of travel of vehicle 10 and, in elevation, is aligned approximately parallel to a road surface 16 depicted in exaggerated form in this instance. Since the radar lobe diverges both in azimuth and in elevation, a portion of the radar beams impinges upon road surface 16 starting at a certain distance in front of vehicle 10. The small surface irregularities on the road surface form targets by which a radar echo is returned to the radar sensor. These radar echoes generated by road surface 16, which are known as ground clutter, are utilized according to the present invention for measuring the ego velocity of vehicle 10. In addition, it is of course also possible to evaluate radar echoes from other stationary objects, e.g., radar echoes from roadside structures adjacent to the road.

Figure 2:
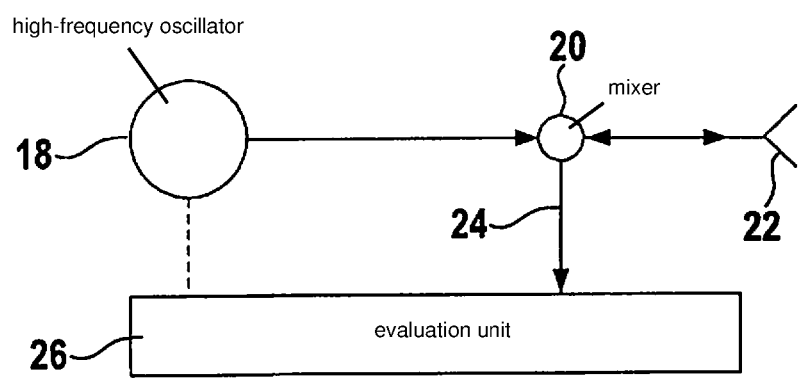
FIG. 2 shows a block diagram of the radar sensor.

FIG. 2 shows FMCW radar sensor 12 in the form of a block diagram. A high-frequency oscillator 18, which is controllable in its frequency, generates a transmit signal that reaches an antenna 22 via a mixer 20 and is then emitted by the antenna as radar lobe 14. The radar echoes produced by road surface 16 or by other objects in front of the vehicle are received by antenna 22 and mixed in mixer 20 with a portion of the transmit signal generated by high-frequency oscillator 18 at the reception instant. In this way an intermediate-frequency signal 24 is obtained by beating, which is further evaluated in an evaluation unit 26.

The frequency of the transmit signal generated by high-frequency oscillator 18 is modulated and forms a series of rising edges 28, 30 and falling edges 32. If an extended object such as a vehicle driving ahead that is at a distance d in front of vehicle 10 is located, then the gradient of the respective edge 28-32 and distance d determine the frequency difference of the signals that are mixed with one another in mixer 20, and thus the frequency of intermediate-frequency signal 24. If the vehicle driving in front moves relative to ego vehicle 10, the frequency difference is furthermore a function of a Doppler shift, which in turn is a function of the relative velocity.

Intermediate-frequency signal 24 is first sampled as a time signal and digitized, and is then converted into a Fourier spectrum, e.g., by a "Fast-Fourier transform". In this spectrum, each located object is characterized in the form of a peak at a certain frequency, which is a function of the distance and the relative velocity of the object. If the same object is now located once at edge 28 and then, slightly later, at edge 32 again, the frequencies of these two peaks may be added up. Since edges 28 and 32 have an opposite gradient, the distance-dependent components cancel each other out and only the Doppler component that is a function of the relative velocity is left. Conversely, if the frequencies of the two peaks are subtracted, the velocity-dependent components cancel each other out, and a pure distance component is obtained, which makes it possible to determine the distance of the object. As a rule, more than just two modulation sequences or edges are used, which differ in their gradients. When two or more objects are present, this allows for an easier allocation of the peaks included in the spectrums to the respective objects.

In the illustrated example, falling edge 34 is followed by a further "modulation sequence" 36 in which the frequency is not really modulated but instead is constant.

Figure 3:
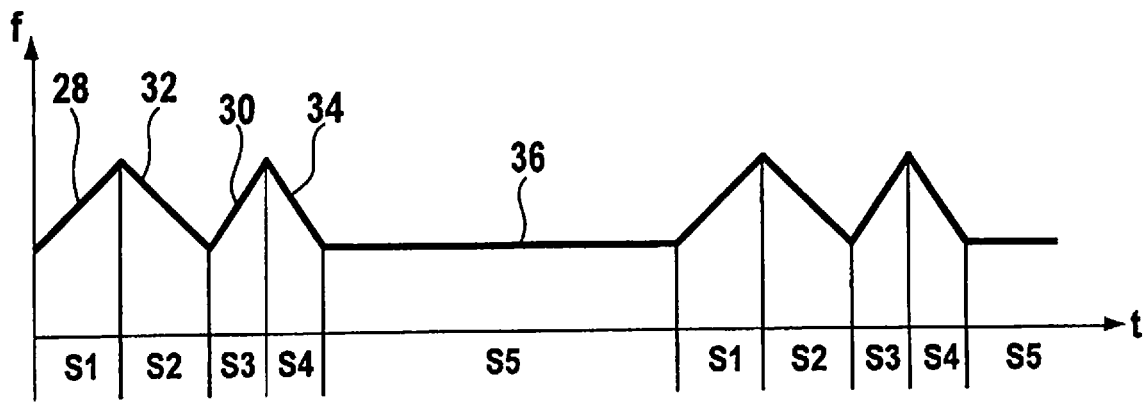
FIG. 3 shows a series of frequency modulation sequences in a transmit signal of the radar sensor according to FIG. 2.

In the example illustrated in FIG. 3, the modulation scheme thus includes a series of five modulation sequences S1-S5, which are periodically repeated. Sequences S1-S4 are FMCW sequences in which the transmit signal is modulated according to edges 28-34. During these sequences, distances and relative velocities of objects in front of vehicle 10 are measured in the usual manner. In modulation sequence S5, on the other hand, the frequency is constant, with the result that the frequency of the received radar echoes, and thus also the frequency of the intermediate-frequency signal, is independent of the distance. Thus, it is a pure Doppler frequency in which a measurement of the relative velocity is performed exclusively. Due to the long measuring duration, the relative velocity is able to be resolved to a considerably greater degree than in the FMCW measurements in sequences S1-S4.

If no other objects are located in front of vehicle 10, then only the so-called ground clutter is measured in sequence S5, i.e., the reflections by rough road surface 16. In this case, the relative velocity, which is indicated by the measured Doppler frequency, is the velocity along the beam from radar sensor 12 to the respective point of the road surface. If this beam forms the angle $\alpha$ with the road surface (and correspondingly with the direction of travel of vehicle 10), and if v is the ego velocity of vehicle 10 (measured in the direction of travel), then the following applies to relative velocity $v_\alpha$ measured for a given angle $\alpha$:

$$v_\alpha = -v^* \cos(\alpha).$$

This relative-velocity signal includes a distance dependency only insofar as angle $\alpha$ is distance-dependent itself.

At least the part of evaluation device 26 that is used for analyzing the spectrum of intermediate-frequency signal 24 is operating in a digital manner. In other words, a discrete spectrum of the intermediate-frequency signal is analyzed. Accordingly, the frequency axis is subdivided into a finite number of so-called frequency bins, and the spectrum is a discrete function (a histogram) that indicates the power share of each frequency bin, as shown in FIG. 4 by way of example.

Figure 4:
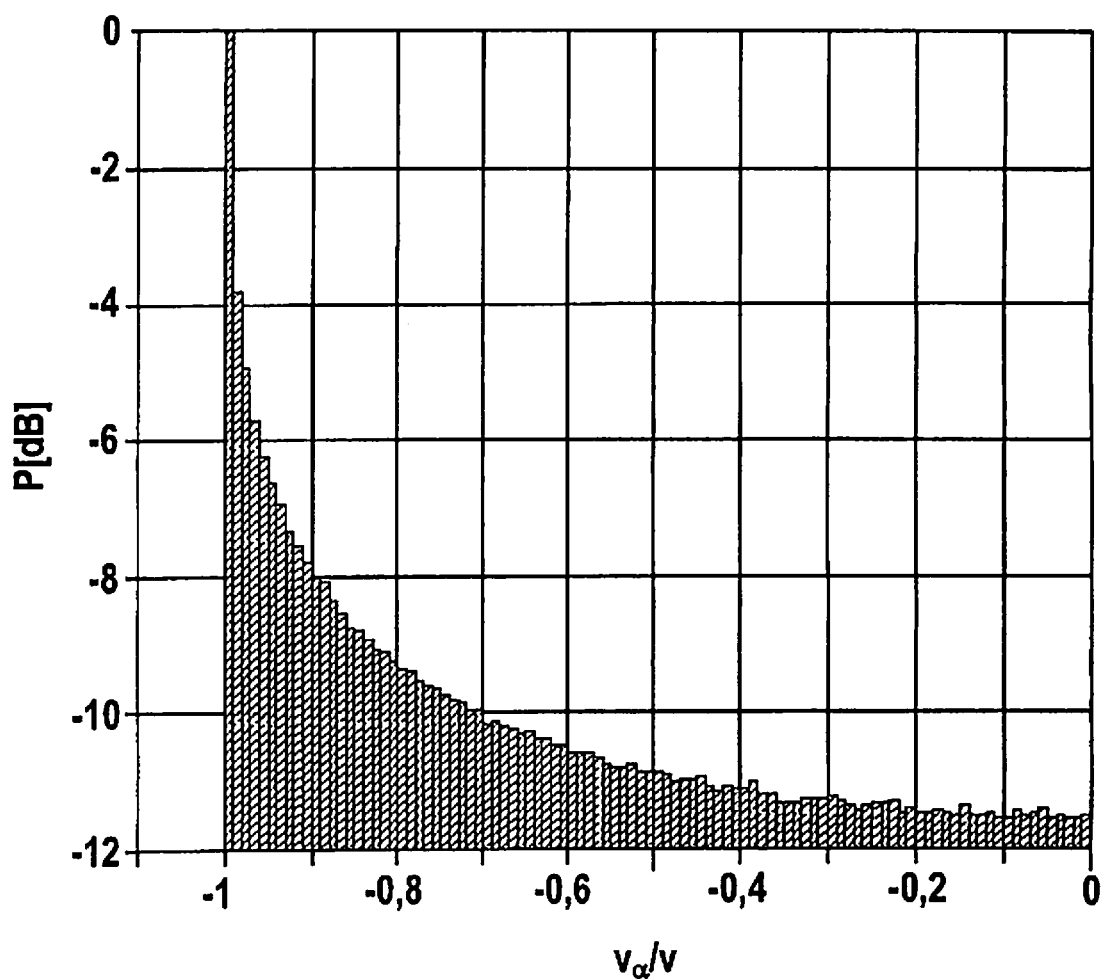
FIG. 4 shows one example of a histogram, which shows a power distribution in a Doppler spectrum of the radar sensor according to FIG. 2.

FIG. 4 illustrates (in a two-dimensional view) the power distribution due to the cosine effect under the assumption that an equal amount of power is received from each direction in space. The quotient of the measured relative velocity $v_\alpha = -v*\cos(\alpha)$ of the targets on road surface 16 and ego velocity v of the vehicle is indicated on the horizontal axis. The power therefore reaches a maximum at $v\alpha/v=-1$. For even smaller (greater according to the absolute amount) relative velocities, the signal abruptly drops to zero.

If angle $\alpha$ approaches the limit value 0, the gradient of the cosine function becomes increasingly smaller, with the result that the relative velocities obtained for different angles $\alpha$ become increasingly similar to one another, so that the radar echoes of an increasing number of targets fall into the same frequency bin. As can be gathered from FIG. 4, this has the result that the power per frequency bin markedly increases with an increasing approach of the limit value −1. The abrupt drop of the power at the relative velocity $v_\alpha/v=-1$ ($\alpha=0$) is therefore particularly striking and easily detectable in the spectrum. It is also advantageous that the value for ego velocity v of the vehicle obtained in this manner is not falsified by pitching motions of the vehicle because the abrupt drop will also occur at the point at which measured relative velocity $v_\alpha$ reaches the value −v.

The object or target may naturally also have a lateral offset. In this case, too, its relative velocity is reduced only according to the cosine of the angle between the radar beam and the forward direction of the vehicle.

In practice, the finite measuring duration causes the occurrence of side lobes in the spectrum, which are attributable to the finite measuring-time window. conventionally, such side lobes are minimized by choosing a suitable window function so that the jump discontinuity at which the signal abruptly drops remains clearly detectable despite the unavoidable side lobes. In this particular case, it is also true that the side lobes are not particularly pronounced anyway because of the very long measuring duration in comparison with the other modulation sequences.

In FIG. 4, the ideal case was considered because no moving objects are located in front of vehicle 10 and the signal obtained in modulation sequence S5 is therefore formed exclusively by the ground clutter. If other objects are located in front of vehicle 10, the spectrum for each one of these objects will include an additional peak in the frequency that corresponds to the relative velocity of the respective object, and the spectrum as a whole is formed by a superposition of these peaks with the ground-clutter signal according to FIG. 4. In the event that the located objects move relatively quickly, e.g., vehicles driving ahead or oncoming vehicles, the peaks of these objects will be at a sufficient distance from the jump discontinuity at −1 m/s, so that this jump discontinuity is always still clearly identifiable. Only in the case of stationary or nearly stationary objects (e.g., pedestrians), the corresponding peak may superpose the jump discontinuity in the ground clutter, as illustrated in FIG. 5.

The precision and reliability of the method described here for measuring the ego velocity may be further increased by additional measures, such as tracking the measuring result over a longer period of time. For example, the case illustrated in FIG. 5 would mean that a slowly moving object is located exactly in front of the ego vehicle in the direction of travel.

Figure 5:
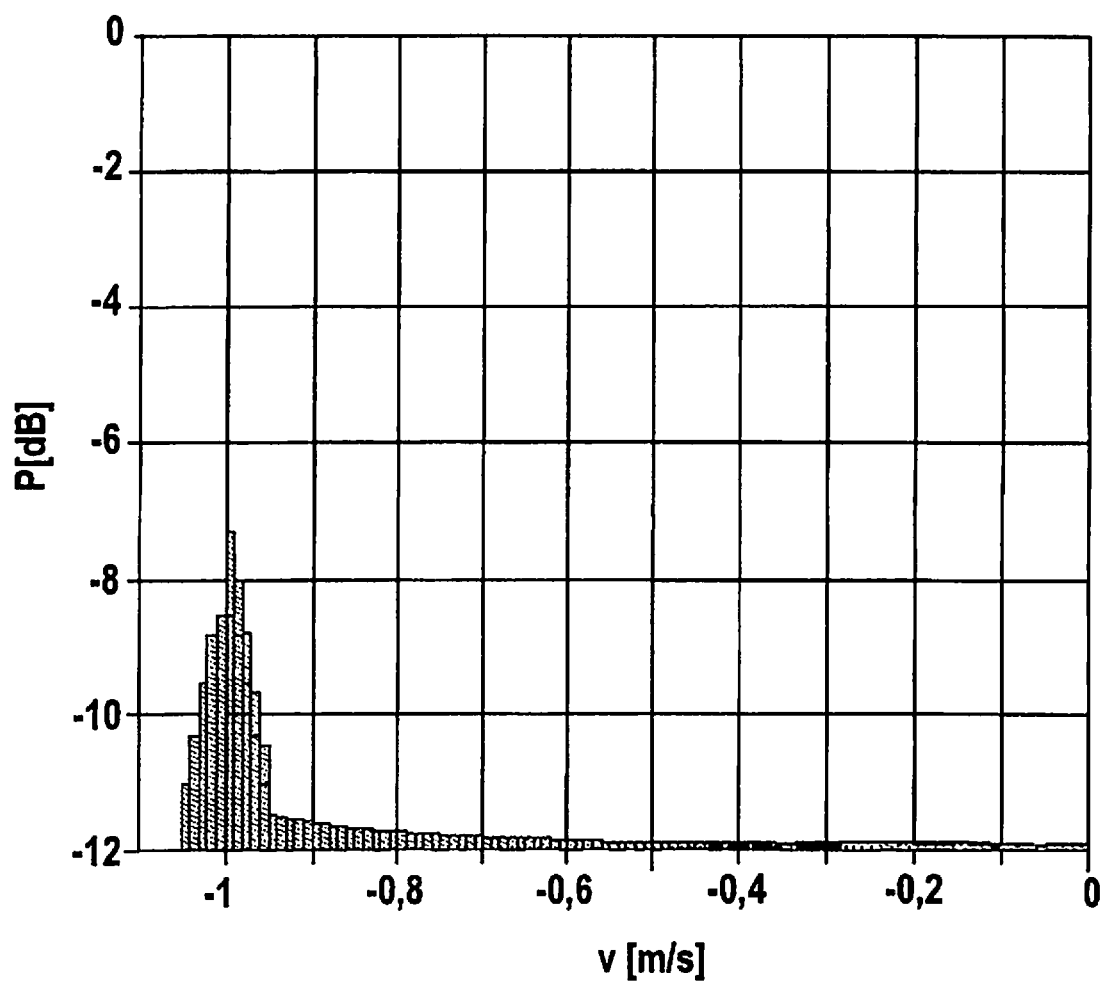
FIG. 5 shows a histogram, which shows the superposition of the Doppler spectrum resulting from a roadway surface according to FIG. 4, with a signal of an object that is moving very slowly (e.g., a pedestrian).

If the jump discontinuity in the ground-clutter signal was measured at an earlier point in time when the peak of the slowly moving object has not yet superposed this jump discontinuity, then it is known at which point during the current measurement—given the presence of the peak of the slowly moving object—the search for the jump discontinuity would have to take place, and by analyzing the signal shown in FIG. 5, only the already previously measured location of the jump discontinuity needs to be verified in addition.

Generally, the FMCS radar sensors used in motor vehicles are angle-resolving sensors. In such a case, it is also possible to use an angle analysis for separating the peak stemming from the slowly moving object from the ground-clutter signal, or more generally, from the signal of all stationary objects. The jump discontinuity in the ground-clutter signal is always most pronounced at the azimuth angle of 0°. In contrast, the peak stemming from the slowly moving object will not be able to lie at the azimuth angle of 0°, at least not for long. This can only be a passing state that may occur while cornering, for instance, because the ego vehicle would otherwise crash into the object. The superposition by the peak is therefore able to be eliminated in that the estimate discards the ego velocity for the particular measuring cycles in which an azimuth angle that clearly deviates from zero is measured for the frequency bin that corresponds to the assumed ego velocity.

It is of course also possible that the results of the described measurement of the ego velocity are adjusted using the mentioned ESP data.

What is claimed is:

1. An FMCW radar sensor for a motor vehicle, comprising:
    a high-frequency oscillator configured to generate a frequency-modulated transmit signal that has a periodically repeating series of modulation sequences featuring different modulation patterns; and
    an evaluation device for evaluating the received radar echo according to the FMCW principle;
    wherein the series of the modulation sequences includes a first group of modulation sequences and a second group of modulation sequences, wherein the second group of modulation sequences has a longer duration than the first group of modulation sequences, wherein the second group of modulation sequences represents a special class of modulation sequences, and wherein a frequency swing of the special class of modulation sequences is smaller than that of the first group of modulation sequences; and
    wherein the evaluation device is configured to carry out a measurement of the ego velocity of the vehicle based on a radar echo that is received from non-moving objects during the modulation sequences that belong to the special class.

2. The FMCW radar sensor as recited in claim 1, wherein the special class of the modulation sequences includes a modulation sequence whose frequency swing is zero.

3. The FMCW radar sensor as recited in claim 1, wherein the evaluation device is configured to perform an angle analysis to separate signals of moving objects from the signal received from the non-moving objects.

4. The FMCW radar sensor as recited in claim 1, wherein the evaluation device is configured to evaluate a ground-clutter signal during the modulation sequences that belong to the special class.

5. The FMCW radar sensor as recited in claim 1, wherein the FMCW radar sensor includes an angle-resolving sensor.

6. The FMCW radar sensor as recited in claim 5, wherein the special class of the modulation sequences includes a modulation sequence whose frequency swing is zero.

7. The FMCW radar sensor as recited in claim 5, wherein the evaluation device is configured to perform an angle analysis to separate signals of moving objects from the signal received from the non-moving objects.

8. The FMCW radar sensor as recited in claim 5, wherein the evaluation device is configured to evaluate a ground-clutter signal during the modulation sequences that belong to the special class.

\* \* \* \* \*